(12) United States Patent
Wang et al.

(10) Patent No.: US 8,524,859 B2
(45) Date of Patent: Sep. 3, 2013

(54) METHOD FOR ELASTOMER FINISHING

(75) Inventors: Yu Feng Wang, Houston, TX (US); Richard C-M Yeh, Houston, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 274 days.

(21) Appl. No.: 13/070,078

(22) Filed: Mar. 23, 2011

(65) Prior Publication Data

US 2012/0071619 A1   Mar. 22, 2012

Related U.S. Application Data

(60) Provisional application No. 61/330,101, filed on Apr. 30, 2010.

(51) Int. Cl.
*C08F 6/00* (2006.01)

(52) U.S. Cl.
USPC .... 528/502 F; 528/480; 528/497; 528/502 R; 528/503; 422/258; 422/259; 422/260; 422/608; 202/175; 202/216; 202/238; 202/265; 526/71; 526/72; 526/335; 526/348; 526/348.7

(58) Field of Classification Search
USPC ............ 528/480, 484, 491, 497, 501, 502 R, 528/502 C, 502 F, 503; 526/67, 71, 72, 291, 526/335, 348, 7; 202/175, 216, 238, 265; 422/129, 131, 258, 259, 260, 608
See application file for complete search history.

(56) References Cited

U.S. PATENT DOCUMENTS

| | | | |
|---|---|---|---|
| 4,068,051 A | 1/1978 | Baldwin et al. | |
| 4,474,924 A | 10/1984 | Powers et al. | |
| 4,909,898 A | 3/1990 | Padliya et al. | |
| 5,162,445 A * | 11/1992 | Powers et al. | 525/333.4 |
| 5,506,316 A | 4/1996 | Shaffer | |
| 5,670,582 A | 9/1997 | Chung et al. | |
| 5,729,911 A | 3/1998 | Kelleher et al. | |
| 7,232,872 B2 | 6/2007 | Shaffer et al. | |
| 7,414,101 B2 | 8/2008 | Shaffer et al. | |

FOREIGN PATENT DOCUMENTS

| | | |
|---|---|---|
| EP | 0 262 594 | 4/1988 |
| EP | 1 127 609 | 4/1988 |
| WO | 2006/034806 | 4/2006 |

* cited by examiner

*Primary Examiner* — Frances Tischler
(74) *Attorney, Agent, or Firm* — Nancy T. Krawczyk

(57) ABSTRACT

In the production of isobutylene-based elastomers the product obtained from the polymerization process is often in the form of a stream. Described herein are an apparatus and a process for removal of hydrocarbon liquids from the elastomer. The process comprises the steps of obtaining a stream comprising hydrocarbon liquids, either solvents or diluents, and an isobutylene-based elastomer; passing the stream through a kneader to volatize the hydrocarbon liquids from the elastomer.

13 Claims, 6 Drawing Sheets

METHOD FOR ELASTOMER FINISHING

CROSS REFERENCE TO RELATED APPLICATIONS

This application claims the benefit of Provisional Application No. 61/330,101 filed Apr. 30, 2010, the disclosure of which is incorporated by reference in its entirety.

FIELD OF THE INVENTION

This disclosure relates to a finishing process for an elastomer. More particularly, this disclosure relates to a method for reducing and removing solvents from an elastomer slurry or elastomer solution.

BACKGROUND OF THE INVENTION

In the production of elastomeric polymers, such as isobutylene-based elastomers, the product obtained from the polymerization process is often in the form of a slurry comprising the precipitated polymer and unreacted dissolved monomers in a solvent. The solvent and dissolved monomers are stripped from the precipitated polymer, with the polymer solids sent to a slurry tank. The water-slurried elastomer is then dewatered, and extrusion dried to form elastomer crumbs for bailing and/or packaging.

U.S. Pat. No. 5,729,911 discloses a process for continuous dewatering/drying of EP(D)M. The process comprises continuously charging wet EP(D)M crumb into a single screw extruder having particular structural features and conveying the wet crumb through the length of the extruder under conditions sufficient to expel water, increase the pressure across the die plate of the extruder and heat the crumb. The dried crumb thus extruded is characterized in that it contains less than 1% water.

However, processes for finishing EP(D)M elastomers may not work for other types of elastomers, such as isobutylene-based elastomers, and especially temperature sensitive halogenated isobutylene-based elastomers. Different elastomers have different slurry chemistries and different viscoelasticity which affect the ability to dewater and dry the elastomer. For example, a slurry of butyl elastomer, particularly halobutyl elastomer, has a higher pH than a slurry of EPDM. This higher pH makes the butyl elastomer crumb more slippery and thus harder to dewater and dry than EPDM crumb. Additionally, elastomer characteristics, such as Mooney viscosity, molecular weight distribution, and the presence or absence of long chain branching, may also affect the ability to dewater and dry the elastomer.

U.S. Pat. No. 4,909,898 (Padliya et al.) discloses a polymer finishing method wherein a slurry comprising a precipitated polymer and a volatile diluent is feed into a mixer/kneader to remove the volatile diluent. Padliya et al. teaches that an immiscible liquid must be added to the slurry.

Therefore, there still remains a need for improved processes for devolatizing and drying isobutylene-based elastomers. In particular, there is a need for a process and apparatus that is able to finish large capacities of isobutylene-based elastomers in a single finishing line.

SUMMARY OF THE INVENTION

Described herein is an apparatus and a process for removal of hydrocarbon liquids from an elastomer following polymerization and optional halogenation of the elastomer. The process comprises the steps of obtaining a stream comprising hydrocarbon liquids, either solvents or diluents, and an isobutylene-based elastomer; passing the stream through a kneader to volatize the hydrocarbon liquids from the elastomer.

One aspect of the invention is directed to a method for removing hydrocarbon liquids from an elastomer stream, the hydrocarbon liquids being either a diluent or a solvent with respect to the elastomer. The method comprising the steps of a) preparing an elastomer stream, the stream comprising isobutylene-based elastomer solids and hydrocarbon liquids; b) introducing the stream into a kneader, wherein the kneader has a central axis, an outer shell wall radially outward of the central axis, at least one flight of paddles extending radially outward from the central axis, and at least one flight of hooks extending radially inward from the outer shell wall toward the core, the hooks having at least one vertical shearing surface and at least one horizontal shearing surface greater than a nominal width of the hook; and c) shearing the elastomer in the stream between the paddles and hooks whereby the elastomer is subjected to shearing forces and at least a portion of the hydrocarbon liquids is volatized from the stream.

In another aspect of the invention, the stream entering the kneader contains at least 10 wt % of elastomer relative to the total weight of the entering stream. In other aspects of the invention, the entering stream contains 20 to 45 wt % of elastomer.

In another aspect of the invention, shearing of the elastomer in the kneader results in an exiting stream containing greater than 20 wt % of elastomer relative to the total weight of the exiting stream. Alternatively, the exiting stream contains greater than 70 wt % of elastomer. In another aspect, the exiting stream contains elastomer solids in the range of 50 to 95 wt % of the exiting stream.

In yet another aspect of the invention, the temperature of the elastomer in the kneader does not exceed 180° C. Alternatively, the shearing of the elastomer results in an exiting elastomer having a temperature in the range of 60° C. to 130° C.

These and other features, aspects, and advantages of the present disclosure will become better understood with regard to the following description and appended claims.

BRIEF DESCRIPTION OF THE FIGURES

The invention will be described by way of example and with reference to the accompanying drawings in which.

DETAILED DESCRIPTION OF THE INVENTION

Figure 1:
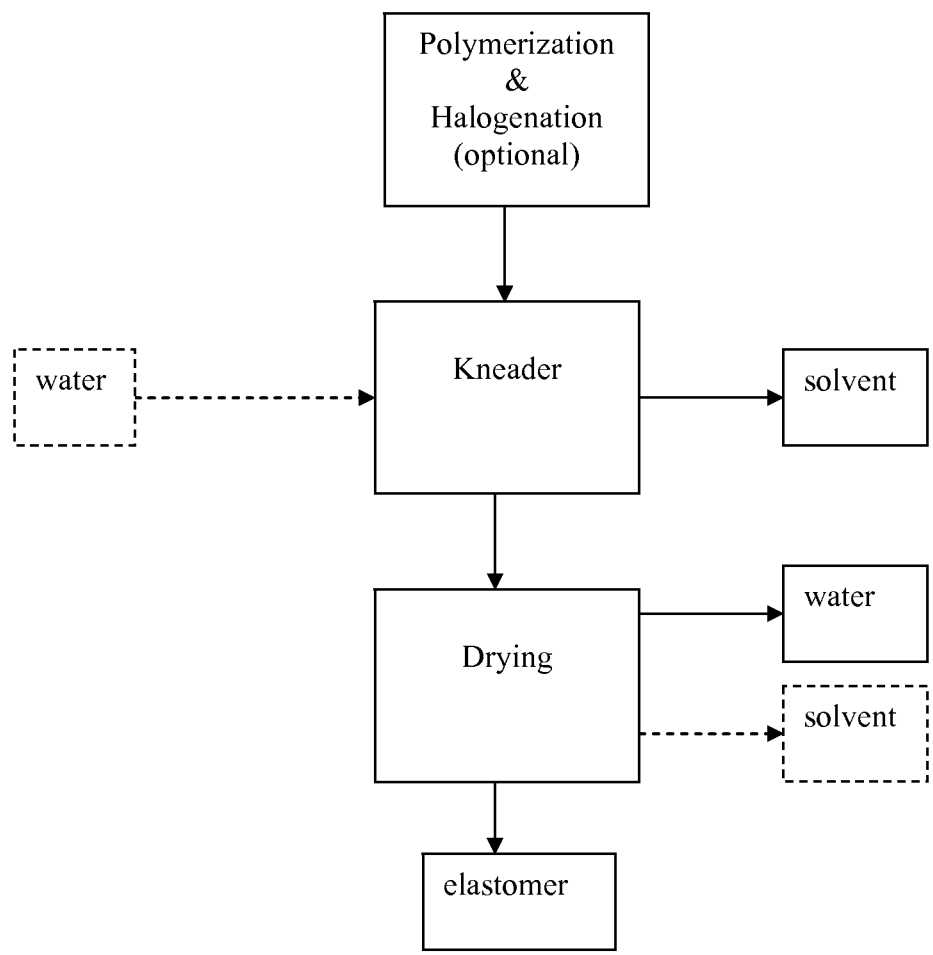
FIG. 1 is a diagram for manufacturing a polymer in accordance with the present invention.

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Definitions applicable to the presently described invention are as described below.

"Diluent" means a diluting or dissolving agent. Diluent is specifically defined to include chemicals that can act as dissolving agents, i.e., solvents, for the Lewis Acid, other metal complexes, initiators, monomers, or other additives, but which preferably do not act as dissolving agents for the elastomer obtained through polymerization of the dissolved monomers. In the practice of the invention, the diluent does not alter the general nature of the components of the polymerization medium, i.e., the components of the catalyst system, monomers, etc. However, it is recognized that interactions between the diluent and reactants may occur. In preferred embodiments, the diluent does not react with the catalyst system components, monomers, etc., to any appreciable extent. Additionally, the term diluent includes mixtures of at least two or more diluents. Diluents, in the practice of the invention, are generally hydrocarbon liquids, which may be halogenated with chlorine or fluorine as disclosed in U.S. Pat. No. 7,232,872.

"Solvent" means a hydrocarbon liquid that is capable of acting as a dissolving agent for an elastomeric polymer. Solvents, in the practice of this invention, are generally hydrocarbon liquids having the formula $C_xH_y$, wherein x is 5 to 20, and y is 12 to 22, such as hexane, isohexane, pentane, isopentane, and cyclohexene.

The term "elastomer," as used herein, refers to any polymer or combination of polymers consistent with the ASTM D1566 definition of "a material that is capable of recovering from large deformations, and can be, or already is, modified to a state in which it is essentially insoluble (but can swell) in boiling solvent." As used herein, the term "elastomer" may be used interchangeably with the term "rubber." Preferred elastomers have a melting point that cannot be measured by DSC or if it can be measured by DSC is less than 40° C., or preferably less than 20° C., or less than 0° C. Preferred elastomers have a Tg of –50° C. or less as measured by DSC.

As used herein, the term "isobutylene based elastomer," refers to an elastomer or polymer comprising at least 70 mol % repeat units from isobutylene. These polymers can be described as random copolymers of a $C_4$ isomonoolefin derived unit, such as an isobutylene derived unit, and at least one other polymerizable unit. The isobutylene-based elastomer may or may not be halogenated.

Preferred elastomers useful in the practice of this invention include a) polymers derived from at least one $C_4$ to $C_7$ isoolefin monomer and at least one multiolefin monomer and b) homopolymers of $C_4$ to $C_7$ isoolefin monomers. Some such copolymers are conventionally referred to as "butyl rubbers." For the copolymers, the isoolefin derived content in the copolymer is in a range from 70 to 99.5 wt % of the total monomer derived units in one embodiment, and 85 to 99.5 wt % in another embodiment. The total multiolefin derived content in the copolymer is present in the range of mixture from 30 to 0.5 wt % in one embodiment, and from 15 to 0.5 wt % in another embodiment. In yet another embodiment, from 12 to 0.5 wt % of the polymer is multiolefin derived units. In yet another embodiment, from 8 to 0.5 wt % of the polymer is multiolefin derived units. Herein for the purpose of this invention, multiolefin refers to any monomer having two or more double bonds. In a preferred embodiment, the multiolefin is any monomer comprising two conjugated double bonds and may be an aliphatic or aromatic monomer.

The $C_4$ to $C_7$ isoolefin may selected from compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, alkylstyrene, and piperylene, and other monomers such as disclosed in U.S. Pat. No. 5,506,316.

When the isoolefin is isobutylene, the elastomers may be referred to as "an isobutylene based elastomer" and refers to an elastomer or a polymer comprising at least 70 mol % isobutylene derived units. One embodiment of the isobutylene based butyl rubber polymer useful in the invention is obtained by reacting 92 to 99.5 wt % of isobutylene with 0.5 to 8 wt % isoprene, or 95 to 995 wt % isobutylene with 0.5 wt % to 5.0 wt % isoprene in yet another embodiment.

The elastomer may also be is a random copolymer comprising a $C_4$ to $C_7$ isoolefins derived units and alkylstyrene derived units, the copolymer containing at least 85%, more alternatively at least 86.5 wt % of the isoolefin units, about 5% to about 12 wt % alkylstyrene units, and about 1.1% to about 1.5 wt % of a halogen. In one embodiment, the polymer may be a random elastomeric copolymer of a $C_4$ to $C_7$ α-olefin and a methylstyrene containing at about 8% to about 12 wt % methylstyrene, and 1.1% to 1.5 wt % bromine or chlorine. The brominated poly(isobutylene-co-p-methylstyrene) polymers are also referred to as BIMSM polymers.

Other $C_4$ to $C_7$ isoolefin derived unit containing elastomers suitable for use in the present invention include terpolymers comprising the isoolefin and two multiolefins wherein the multiolefins have different backbone structures prior to polymerization. Such terpolymers include both block and random terpolymers of $C_4$ to $C_8$ isoolefin derived units, $C_4$ to $C_{14}$ multiolefin derived units, and alkylstyrene derived units. One such terpolymers may be formed form isobutylene, isoprene, and alkylstyrene, preferably methylstyrene, monomers. Another suitable terpolymer may be polymerized from isobutylene, cyclopentadiene, and alkylstyrene monomers. Such terpolymers are obtained under cationic polymerization conditions.

Exemplary elastomers are characterized by a narrow molecular weight distribution (Mw/Mn) of less than 5, alternatively less than 2.5, an exemplary viscosity average molecular weight in the range of 200,000 up to 2,000,000 and an exemplary number average molecular weight in the range of 25,000 to 750,000 as determined by gel permeation chromatography.

Formation of butyl elastomers is well known to those skilled in the art, and is described in detail in, for example, U.S. Pat. Nos. 2,356,128, 4,474,924, 4,068,051, 7,232,872, and 7,414,101. As disclosed in these references, the monomers and catalysts are dissolved in a hydrocarbon solvent, in which the polymerization occurs. If the polymerization is a slurry polymerization, the solvent is selected such that the resulting polymer will precipitate out of the solvent upon formation. Slurry polymerization conventionally yields a slurry containing 10 to 70 wt % solids in the slurry. Following polymerization, for both solution polymerization (wherein the polymer remains dissolved in the solvent) and slurry polymerization, the polymer must be recovered from the solvent. This is typically done in a flash drum, followed by washing and drying of the polymer to yield a rubber crumb suitable for baling and package, see FIG. 5.

Figure 6:
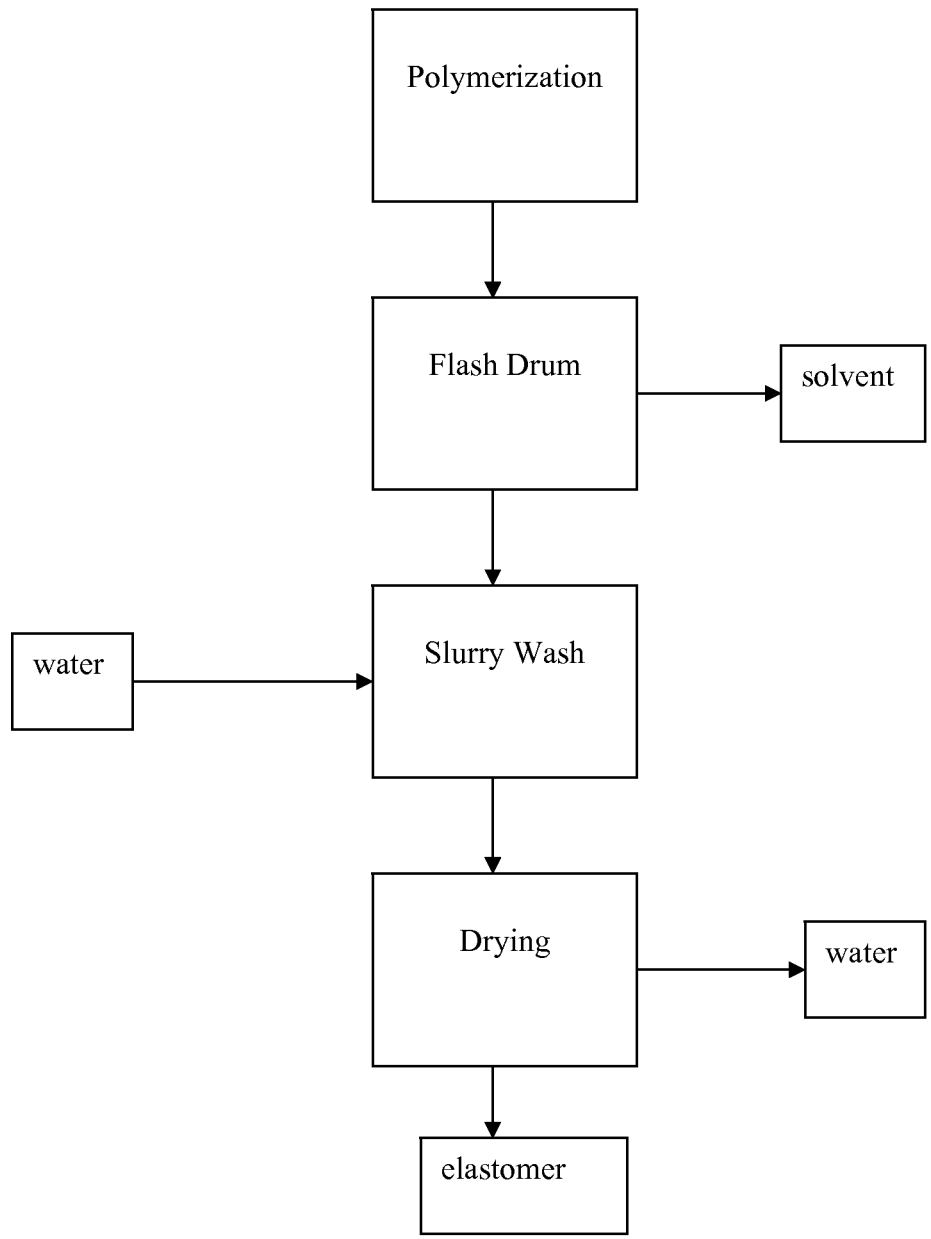
FIGS. 6 and 7 are diagrams of the prior art processes for manufacturing a polymer via slurry polymerization and halogenating a polymer, respectively.
Figure 7:
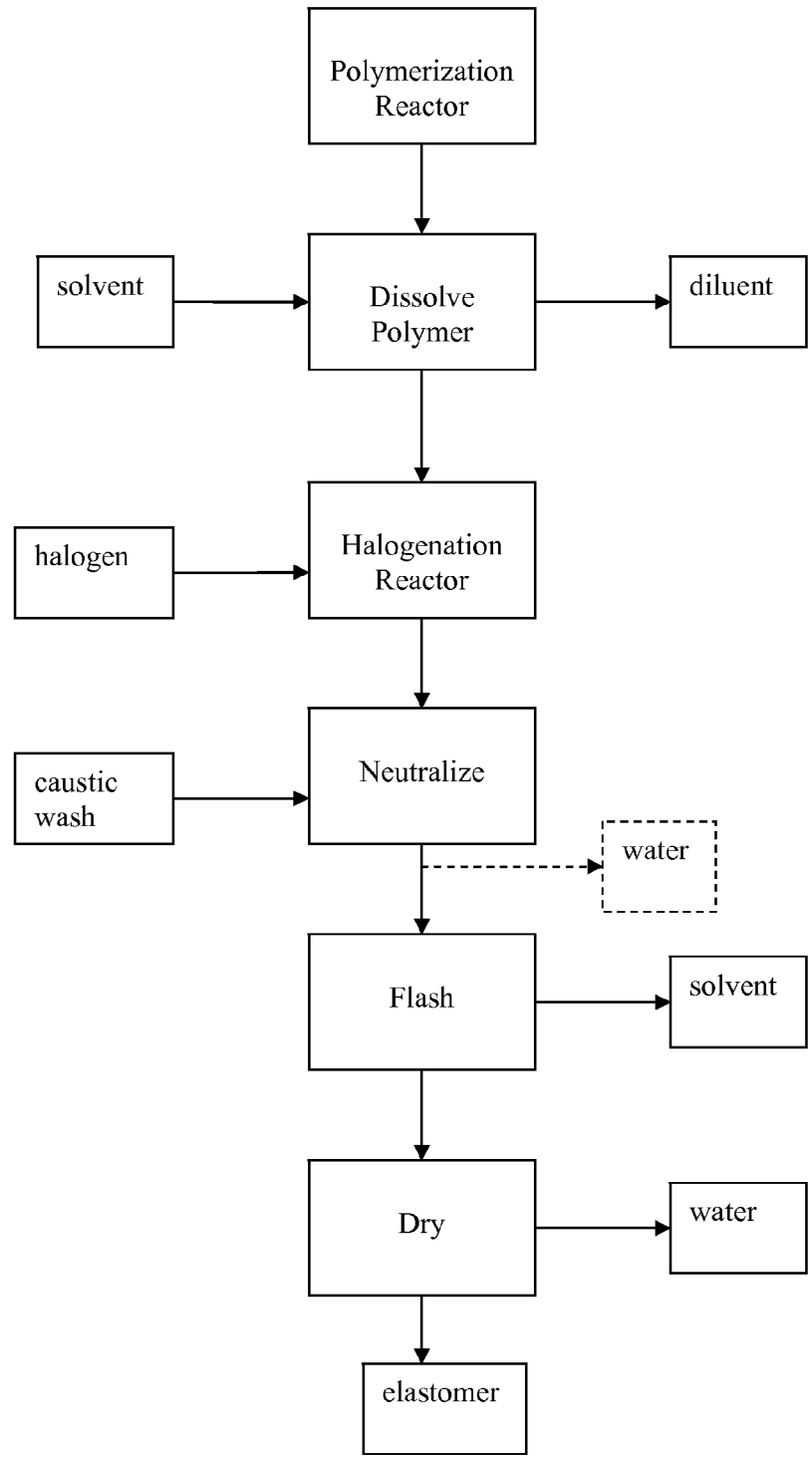

If the butyl is to be halogenated, for polymer prepared via slurry polymer, the slurry is treated to remove any remaining unreacted monomers and replace the polymerization diluent with a hydrocarbon to dissolve the polymer and create a solution, i.e. a single phase liquid, see FIG. 6. The dissolved polymer solution is also referred to as polymer cement, and it is then treated to remove any remaining unreacted monomers. For halogenated butyl polymers, the solution should be essentially free of unreacted monomers or low molecular weight side species may form during halogenation. Such species can negatively affect the desired end properties of the final halogenated polymer.

Halogenation of the dissolved monomer is carried out by adding bromine or chlorine to the polymer cement solution. Halogenation of isobutylene copolymers is also described in U.S. Pat. No. 5,670,582. The halogen wt % in the formed elastomer is from 0.1 to 10 wt % based on the weight of the halogenated elastomer in one embodiment, and from 0.5 to 5 wt % in another embodiment. In yet another embodiment, the halogen wt % of the halogenated rubber is from 1.0 to 2.5 wt %.

After halogenation, the solution is subjected to a neutralization step wherein the by-product of the halogenation, HBr or HCl, is conventionally reacted with an aqueous caustic solution to yield a soluble salt in an aqueous phase. Following neutralization, some or all of the aqueous phase may be optionally removed prior to removal of the hydrocarbon solvent in which the halogenated elastomer is still dissolved. For such water removal, the temperature of the solution should not exceed 100° C. or the properties of the final halogenated polymer may be negatively affected.

For both the halogenated and non-halogenated polymer, the isobutylene-based polymer is then finished by stripping of the solvents from either the slurry or the solution and drying of the resulting solid polymer into a crumb form that may be baled or packaged. The drying is conventionally accomplished using continuous helical path extruders wherein, as the polymer passes through the extruders, the elastomer solids are masticated and the water is squeezed or evaporated out of the mixture by the helical blades of the extruder.

The process and apparatus described herein are particularly useful for assisting in finishing isobutylene-based elastomers, especially halogenated versions of these elastomers. Non-limiting examples isobutylene-based elastomers include poly(isobutylene), butyl rubber (isoprene-isobutylene rubber, "IIR"), branched ("star-branched") butyl rubber, star-branched polyisobutylene rubber, bromobutyl, chlorobutyl, block terpolymers of isoprene-isobutylene-styrene, random copolymers of isobutylene and para-methylstyrene, halogenated random copolymers of isobutylene and para-methylstyrene, random terpolymers of isobutylene, isoprene, and para-methylstyrene, and halogenated random terpolymers of isobutylene, isoprene, and para-methylstyrene, and mixtures thereof.

In accordance with the present invention, following polymerization, and optional halogenation, instead of employing a conventional solvent stripping, optionally slurry water wash, followed by extruding the elastomer for removal of all of the water, a kneader/concentrator is used to generate shear work in the elastomer which is either in a slurry or in solution and removal the volatile diluent or solvents from the manufacturing process, see FIG. 1.

Figure 2:
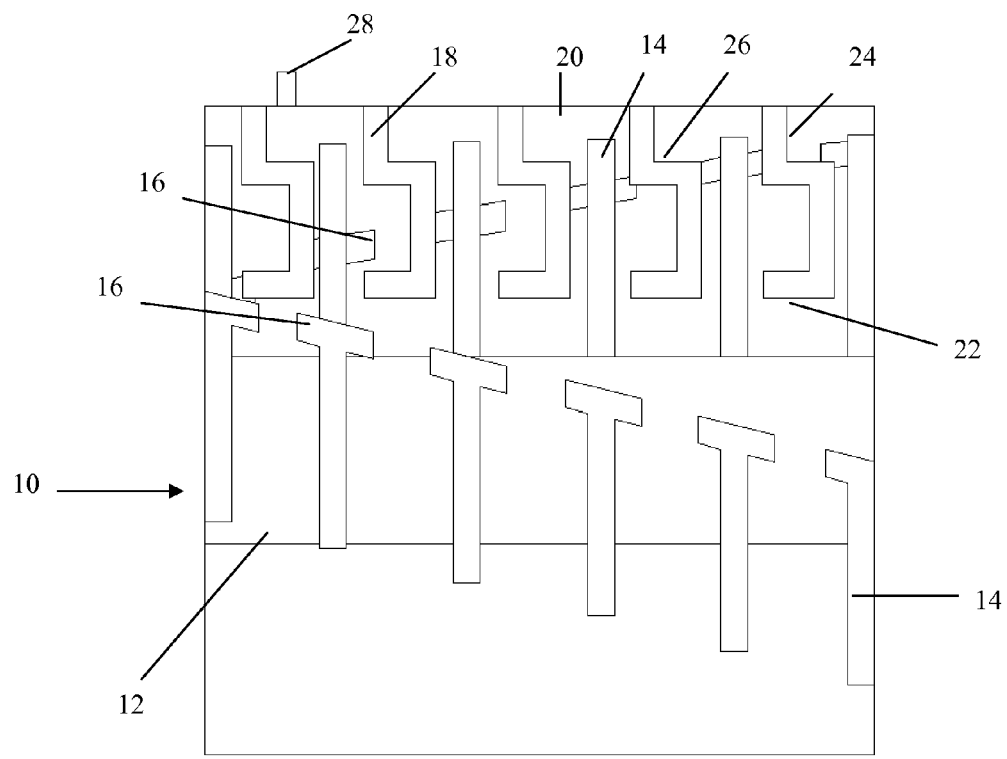
FIG. 2 is a cross-sectional schematic of a kneader useful in the present invention.
Figure 3:
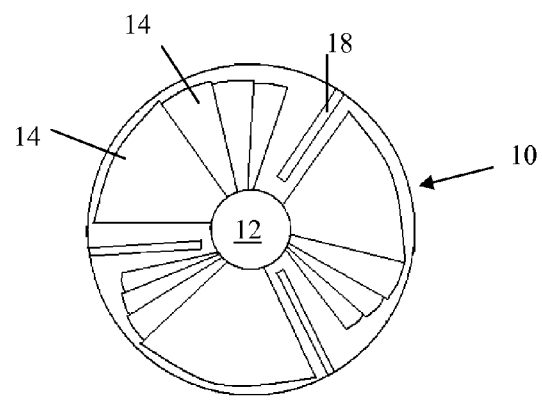
FIG. 3 is a cross-sectional end-view schematic of a kneader.

A simple schematic for an exemplary kneader/concentrator 10 is illustrated in FIGS. 2 and 3. The kneader generally has a long cylindrical configuration having a defined length L to diameter D ratio of at least 1:1. The kneader 10 has a central core 12 located about the kneader's central axis. Along the outside length of the core 12 are at least two flights of shearing paddles; with three to ten flights in one embodiment, and four to eight flights in another embodiment. A "flight" of paddles is defined as a grouping or series of paddles along a common line or angle. The number of flights in the kneader is dependant on a variety of factors including the kneader diameter, the core diameter, and the width of each paddle 14. Each flight of paddles 14 contains at least four and up to 100 paddles. The number of paddles 14 is dependant on a variety of factors including the length of the kneader, the core diameter, the kneader diameter, the amount of shear energy desired to be generated in the elastomer. In FIG. 2, six paddles 14 are illustrated in two flights, while FIG. 3 illustrates three flights of four paddles each.

Figure 5A:
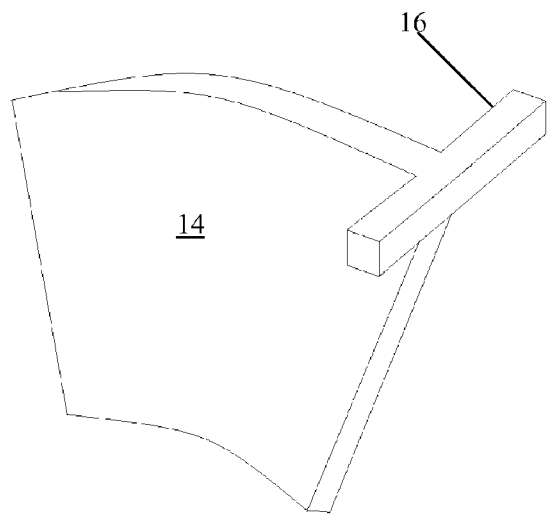
FIGS. 5A and 5B are shearing paddles.

Each paddle flight extends at an angle along the longitudinal length of the central core 12; as the length of the kneader 10 and core 12 increases, the angle formed by each flight generates into a helical pattern about the core 12. For a long core length, each flight might fully wrap itself at least once about the core 12. Due to the angle, when the kneader is viewed from each end, a portion of each successive paddle 14 in each flight is visible. In the illustrated kneader 10, each paddle 14 has a truncated triangular shape, see FIG. 5A. The width of the paddle 14 is measured across the transverse width of the core 12. At an upper edge of the paddle 14 is a clearing bar 16 (the orientation of paddle 14 in FIG. 5A is reversed from those in FIG. 2 for clarity of bar 16). The illustrated clearing bar 16 is oriented along a horizontal axis; however, to affect the flow of elastomer through the kneader, the bar 16 may be inclined at an angle relative to the horizontal axis. For example, the bar may form an angle of 5° to 30° to the horizontal axis. The radially innermost edge of the bar 16, relative to the kneader core 12, for such an angled bar 16 will enable the bar 16 to push the elastomer either back into the kneader for back-mixing of the elastomer or towards the exit to ensure movement of the elastomer through the kneader.

Figure 5B:
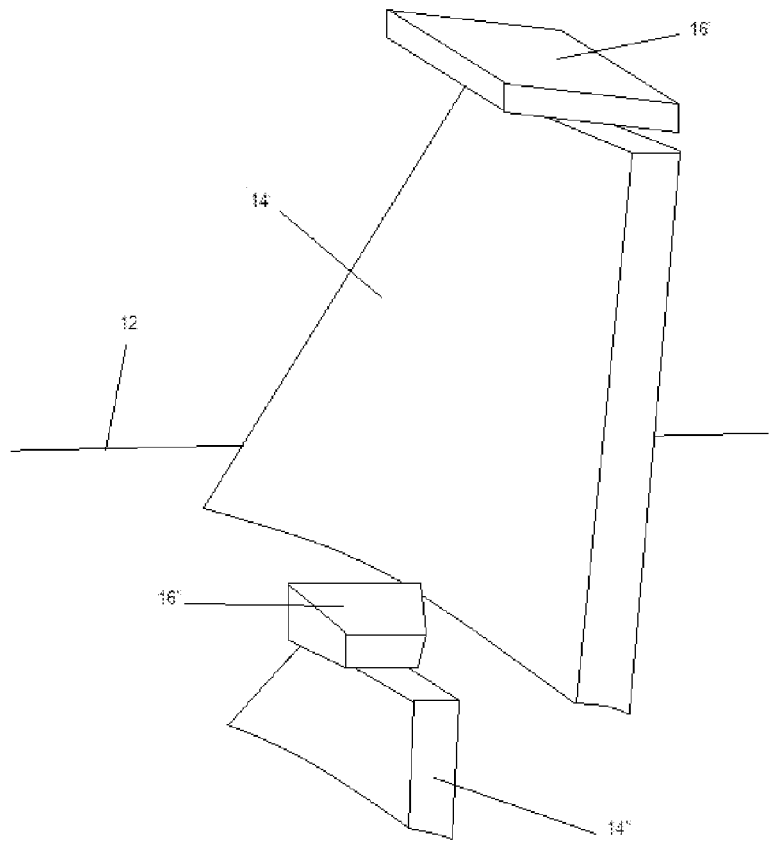

An alternative paddle 14' is shown in FIG. 5B wherein the clearing bar 16' has a more slab like configuration, thereby increasing the shearing surface of the paddle. Adjacent to the paddle 14' is a secondary paddle 14". The secondary paddle 14" has a clearing bar 16". The height of the secondary paddle 14" is less than paddle 14'; as the secondary paddle 14" is adjacent to the paddles 14 and 14', the height is limited to not greater than the clearance between the core 12 and the bottom 22 of the kneading hooks 18 (see further discussion). The kneader 10 may comprise flights of the secondary paddle 14"—the flights of the secondary paddles 14" having some or all of the same characteristics of the flights of paddle 14. In one embodiment, the number of paddles 14" in each flight is one-half to one-fifth the number of primary paddles 14 in the kneader. The secondary paddles 14" increase the shearing surface area in the kneader. The selective use and placement of the secondary paddles 14" enables the elastomeric manufacturer to optimize the shear forces to which the elastomer is subjected.

Figure 4:
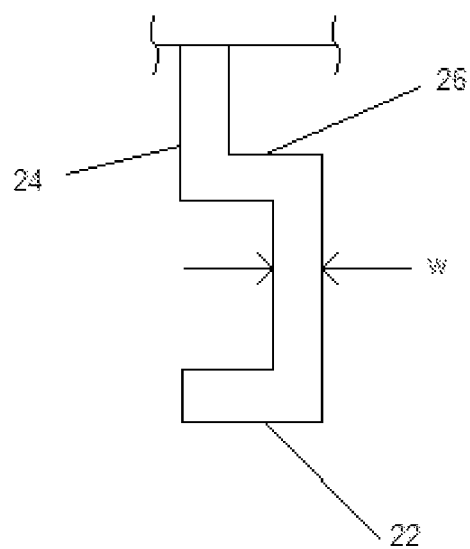
FIG. 4 is a cross-sectional schematic of an individual kneading hook.

As the core 12 rotates, the paddles 14 pass adjacent to kneading hooks 18 that extend from the outer wall 20 of the kneader 10. The kneading hooks 18 are also arranged in flights along the length of the kneader 10. Each kneading hook 18 has a radially inner terminal end 22 that does not contact the core 12. The kneading hook 18 is configured to obtain a desired surface area for shearing of the elastomer; this results in a combination of vertical shearing surfaces 24 and horizontal shearing surfaces 26. The kneading hook has at least one horizontal shearing surface 26 that has a width greater than the nominal width w of the kneading hook, as measured parallel to the angle formed by the kneading hook flight, see FIG. 4. If the hook 18 terminates in a horizontal orientation, as illustrated, the radially inner terminal end 22 also contributes to the horizontal shear surface area.

While the hooks 18 are illustrated as being mounted in a straight line (see FIG. 3) along the length of the kneader 10, the hooks 18 may also be arranged at an angle corresponding to or the inverse of the angle of the paddle flights. The number of hook flights may correspond to the number of paddle flights, see FIG. 3, or the number of hook flights may be more or less than the number of paddle flights.

The clearing bar 16 of the paddle 14 passes over the radially outermost horizontal shearing surface 26. By the interaction of the paddles 14 and the kneading hooks 18 as the core 12 rotates, elastomer present in the kneader 10, either in a solution or in a slurry, is sheared between the paddles and hooks. As the elastomer is subjected to the shearing forces, and the kneader is operated under vacuum conditions, the elastomer is heated and the volatiles are evaporated out of at least one vent 28.

In one embodiment, the kneader 10 is initially filled to not more than 90% of the capacity volume of the kneader 10. In another embodiment, the kneader 10 is filled to not more than 60% of the kneader volume capacity. In yet another embodiment, the kneader 10 is filled to between 40% to 55% of the kneader volume capacity.

As noted above, following polymerization and optional halogenation of the elastomer, the stream entering the kneader may be either a slurry containing precipitated elastomer or a solution containing dissolved elastomer; regardless, the stream has a defined elastomer content which may be expressed in terms of weight percent relative to the total weight of the stream, either the entering or the exiting stream depending upon which value is being discussed. The solids content of the entering stream is at least 10 wt %; in another embodiment, the entering stream is at least 20 wt % solids, is at least 30 wt % solids in yet another embodiment, and is in the range of 20 to 45 wt % solids in yet another embodiment. As the stream passes through the kneader, the solids content increases. In one embodiment, the final solid content of the exiting stream is greater than 20 wt % solids. In another embodiment, the final solid content of the exiting stream is greater than 70 wt % solids. In another embodiment, the final solid content of the exiting stream is greater than 80 wt % solids. In another embodiment, the solids content of the exiting stream is in the range of 50 to 95 wt %. In accordance with the invention, any of the above entering solids content may be treated to achieve any of the above cited higher exiting solids content.

Conversely, at least 20 vol % of the solvent or diluent is removed from the elastomer stream; in another embodiment, at least 60 vol % of the solvent or diluent is removed from the elastomer stream; and in yet another embodiment, 60 to 85 vol % of the solvent or diluent is removed from the stream.

While it is possible to achieve a 100 wt % solids in the exiting stream, as the solids weight percent increases along the length of the kneader 10, the stream becomes more viscous. This increase in stream viscosity in turn results in higher shear energy worked on the elastomer. This increased shear energy can have a negative impact on the elastomer. Elastomeric materials have 'scorch time' memory and can tolerate being subjected to high temperatures for a limited time. Once the scorch time for a material is reached, the torque properties of the elastomer begin to degrade. To maintain processability of the elastomers for further processing and shaping into articles, it is desired to limit the heat applied to the elastomer as it is dried. In one embodiment, the temperature of the elastomer exiting the kneader 10 should not exceed 180° C. In another embodiment, the temperature of the exiting elastomer should not exceed 170° C. In another embodiment, the temperature of the exiting elastomer should not exceed 150° C. In another embodiment, the temperature of the exiting elastomer should be in the range of 60° C. to 130° C. The temperature should be greater than the boiling point of water to evaporate any remaining water, and also greater than the boiling point of the volatiles in the stream. If the temperature of the stream is controlled to not more than 180° C., the exiting stream may achieve greater than 95 wt % solids.

The configuration of the paddles 14 and kneading hooks 18 may vary from those illustrated so long as the follow basic requirements are met: each paddle flight should helically wrap about the kneader core 12 and the shearing surface area of the kneading hooks 18 is maxined for the desired amount of shear energy to be inputted into the elastomers. As the shearing surface area available to the elastomer increases, from both the paddles 14 and the hooks 18, while the amount of devolatilization increases, the scorch time memory also increases. For temperature sensitive elastomers, such as halogenated isobutylene-based elastomers, the temperature of the elastomer should not exceed 180° C. If necessary or desired, the configuration of the paddles 14 and kneading hooks 18 may vary along the length of the kneader 10. For example, to prevent excessive heat buildup in the elastomer, the initial paddles and kneading hooks may have a lower shear surface area than the paddles and kneading hooks closer to the discharge end of the kneader. Alternatively, multiple kneaders with different shear surfaces areas in each kneader may be arranged in series.

To assist in devolatilization, water and inert gasses may be injected into the kneader. The evaporating water will also act as a cooling medium. As the conventional solvents used in isobutylene-based elastomers have a boiling point less than the boiling point of water, this injection of water will not reduce the removal of the solvent from the stream.

In distinction from conventional devolatizing extruders, the elastomer in the stream is subjected to less heat even when the kneader 10 has a length greater than a conventional devolatizing extruder. This reduces the scorch time memory of the elastomer and enable the elastomer manufacturer to prepare elastomers with improved processing properties and limit undesirable processing characteristics for the elastomer end-users. To complete full drying of the elastomer, multiple kneaders may be used to achieve the final elastomer, complementing or replacing the use of conventional drying extruders.

The invention has been described above with reference to numerous embodiments and specific examples. Many variations will suggest themselves to those skilled in this art in light of the above detailed description. All such obvious variations are within the full intended scope of the appended claims.

What is claimed is:

1. A method for removing hydrocarbon liquids from an elastomer stream, the method comprising the steps of:
  a) preparing an elastomer stream, the stream comprising isobutylene-based elastomer solids and hydrocarbon liquids;
  b) introducing the stream into a kneader, wherein the kneader has a central axis, an outer shell wall radially outward of the central axis, at least one flight of paddles extending radially outward from the central axis, and at least one flight of hooks extending radially inward from the outer shell wall toward the core, the hooks having at least one vertical shearing surface and at least one horizontal shearing surface greater than a nominal width of the hook; and c) shearing the elastomer in the stream between the paddles and hooks whereby the elastomer is subjected to shearing forces and at least a portion of the hydrocarbon liquids is volatized from the stream.

2. The method of claim 1, wherein the stream introduced into the kneader contains at least 10 wt % of elastomer.

3. The method of claim 1, wherein shearing of the elastomer results in an exiting stream containing greater than 70 wt % of elastomer.

4. The method of claim 1, wherein the temperature of the elastomer in the kneader does not exceed 180° C.

5. The method of claim 1, wherein shearing of the elastomer results in an exiting elastomer having a temperature in the range of 60° C. to 130° C.

6. The method of claim 1, wherein the residence time of the elastomer as it passes through the kneader is in the range of 5 to 30 minutes.

7. The method of claim 1, wherein the isobutylene-based elastomer is a halogenated isobutylene-based elastomer.

8. The method of claim 1, wherein the isobutylene-based elastomer comprises units derived from at least one multiolefin.

9. The method of claim 8, wherein the at least one multiolefin is selected from the group consisting of isoprene, butadiene, 2,3-dimethyl-1,3-butadiene, myrcene, 6,6-dimethylfulvene, hexadiene, cyclopentadiene, methylcyclopentadiene, alkylstyrene, and piperylene.

10. The method of claim 1, wherein the elastomer is a copolymer having a substantially homogeneous compositional distribution, and comprises about 8 to about 12 wt % of alkystyrene moieties.

11. The method of claim 1, wherein the elastomer stream entering the kneader contains at least 10 wt % solids and the stream exiting the kneader contains greater than 20 wt % solids.

12. The method of claim 11, wherein at least 20 vol % of the hydrocarbon liquid entering the kneader is volatized from the elastomer stream.

13. The method of claim 1, wherein the elastomer stream entering the kneader has a solids content in the range of 20 to 45 wt % and the exiting stream has a solids content in the range of 50 to 95 wt %.

* * * * *